United States Patent
Koya

(10) Patent No.: US 8,493,352 B2
(45) Date of Patent: Jul. 23, 2013

(54) PORTABLE TRANSMITTER WITH PUSH SWITCH AND TOUCH SENSOR

(75) Inventor: Hidetaka Koya, Anjo (JP)

(73) Assignee: Denso Corporation, Kariya (JP)

( * ) Notice: Subject to any disclaimer, the term of this patent is extended or adjusted under 35 U.S.C. 154(b) by 153 days.

(21) Appl. No.: 13/065,231

(22) Filed: Mar. 17, 2011

(65) Prior Publication Data

US 2011/0227854 A1    Sep. 22, 2011

(30) Foreign Application Priority Data

Mar. 19, 2010    (JP) .................................. 2010-64907

(51) Int. Cl.
*G06F 3/041*    (2006.01)
(52) U.S. Cl.
USPC .......................................... 345/173; 345/156
(58) Field of Classification Search
USPC .................................................. 345/156–173
See application file for complete search history.

(56) References Cited

U.S. PATENT DOCUMENTS

| | | | |
|---|---|---|---|
| 7,084,526 B2 * | 8/2006 | Bruwer ........................... | 307/87 |
| 2003/0076298 A1 * | 4/2003 | Rosenberg .................... | 345/156 |
| 2008/0106523 A1 * | 5/2008 | Conrad .......................... | 345/173 |
| 2008/0256755 A1 * | 10/2008 | Ieda et al. ....................... | 16/412 |
| 2011/0057899 A1 * | 3/2011 | Sleeman et al. ............... | 345/174 |

FOREIGN PATENT DOCUMENTS

| | | |
|---|---|---|
| JP | 4-302275 | 10/1992 |
| JP | 6-252782 | 9/1994 |
| JP | 2001-236163 | 8/2001 |
| JP | 2001-320787 | 11/2001 |
| JP | 2002-152867 | 5/2002 |
| JP | 2004-007416 | 1/2004 |
| JP | 2004-120394 | 4/2004 |
| JP | 2004-297648 | 10/2004 |
| JP | 2010-018225 | 1/2010 |

* cited by examiner

*Primary Examiner* — Viet Pham
(74) *Attorney, Agent, or Firm* — Harness, Dickey & Pierce, PLC

(57) ABSTRACT

A portable transmitter is provided which transmits an operating instruction in the form of a radio wave to a controlled device which continues to operate while receiving the operating instruction. The portable transmitter includes a push switch and a touch sensor. The portable transmitter works to supply the electric power to the touch sensor for a given period of time in response to depression of the push switch. When the touch sensor senses a user's touch thereon, and the push switch is depressed, the portable transmitter transmits the operating instruction to the controlled device and continues such transmission as long as the touch sensor senses the touch thereon regardless of the depression of the push switch. In other words, once the operating instruction has been outputted to the controlled device, the user is required only to touch the touch sensor in order to make the controlled device continue the operation.

5 Claims, 5 Drawing Sheets

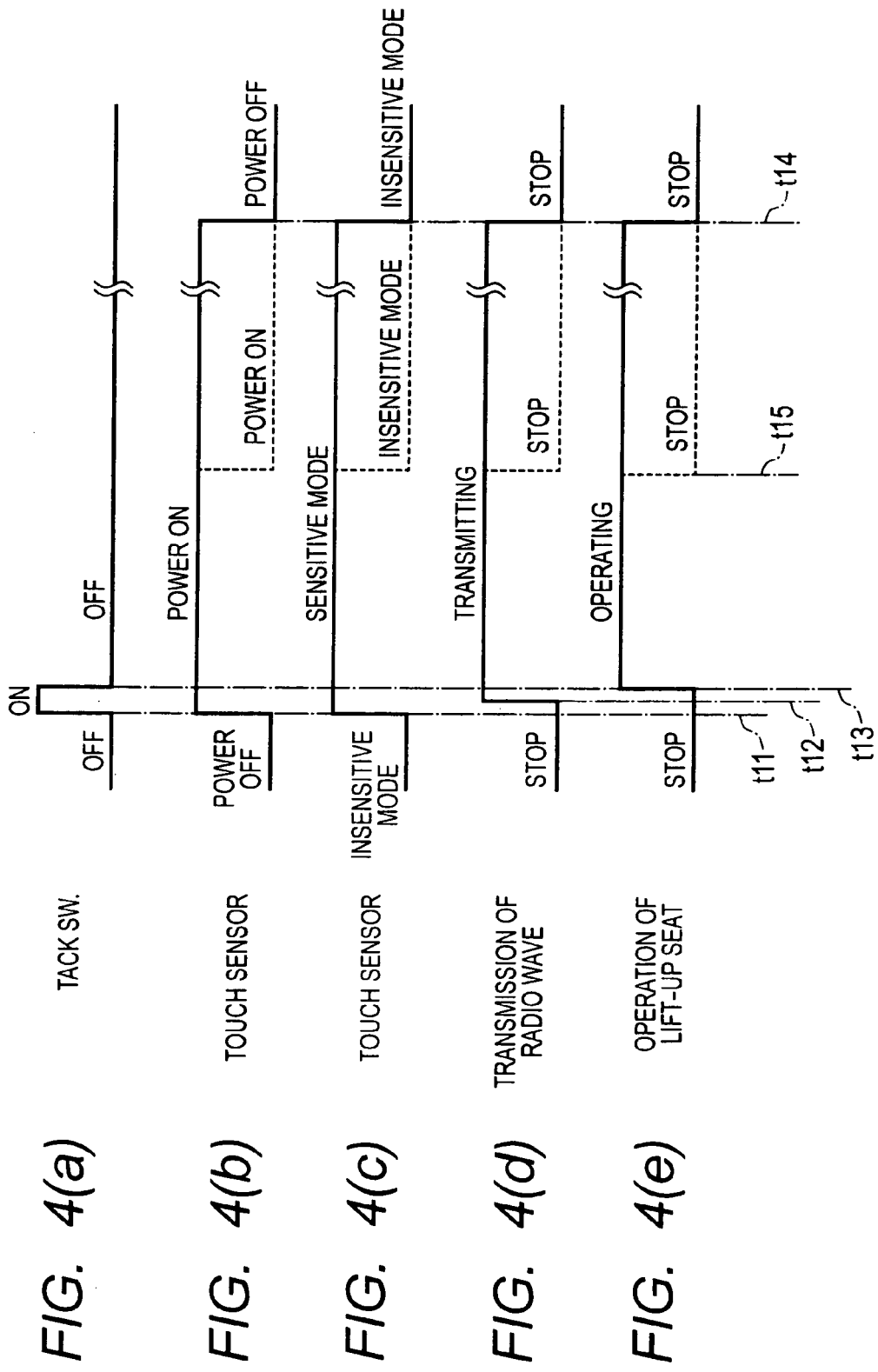

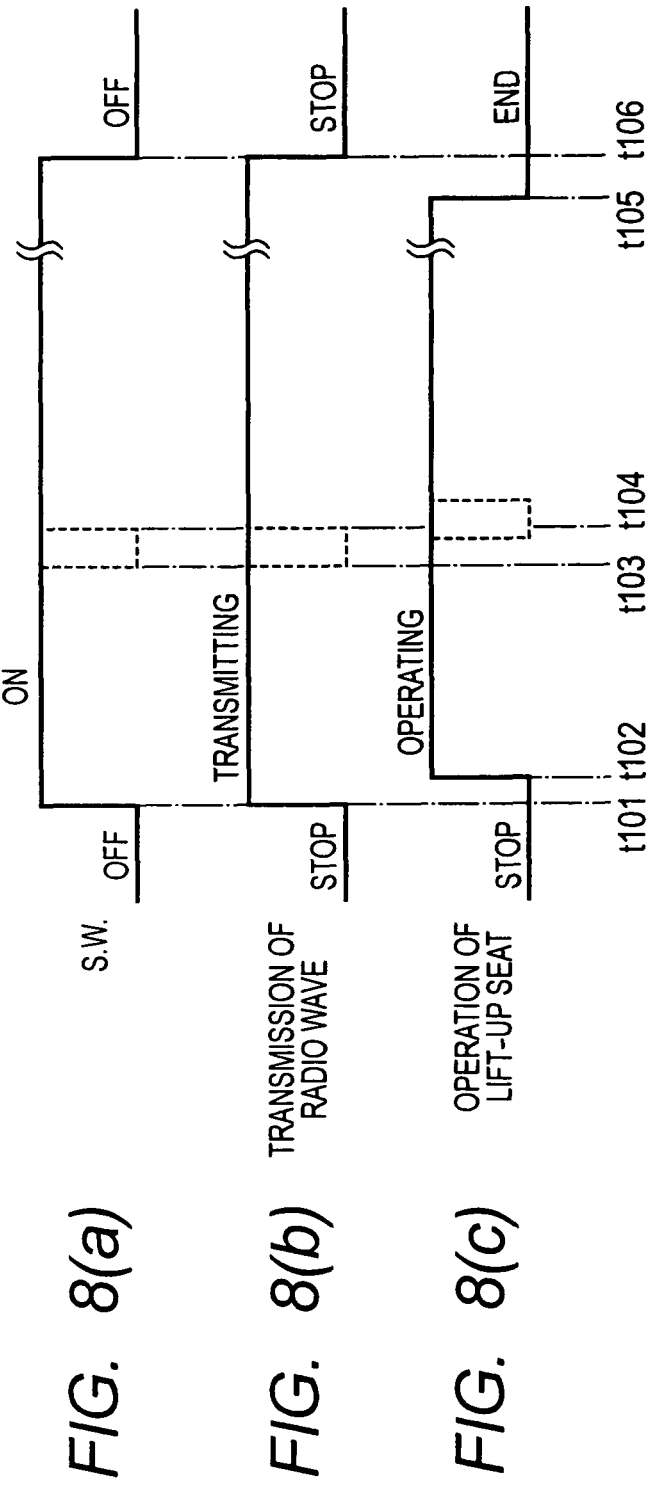

PORTABLE TRANSMITTER WITH PUSH SWITCH AND TOUCH SENSOR

CROSS REFERENCE TO RELATED DOCUMENT

The present application claims the benefits of Japanese Patent Application No. 2010-64907 filed on Mar. 19, 2010, the disclosure of which is incorporated herein by reference.

BACKGROUND

1. Technical Field

The present invention relates generally to a portable transmitter which transmits operating instructions in the form of a radio wave to a controlled device installed, for example, in an automotive vehicle.

2. Background Art

Japanese Patent First Publication No. 6-252782 discloses a portable transmitter which transmits start instructions in the form of a radio wave to an engine installed in a two-wheel vehicle such as a motorcycle. The portable transmitter has two pushbutton switches installed in opposed ends of a casing thereof. The pushbutton switches are electrically connected in series with each other. Only when the pushbutton switches are both placed in an on-state simultaneously, the portable transmitter outputs the start instructions in the form of a radio wave to the vehicle to start the engine. This minimizes errors in manual operation of the pushbutton switches.

An automotive lift-up seat 200, as illustrated in FIG. 7(a), and a portable transmitter which transmits operating instructions in the form of a radio wave to the vehicle to swivel or rotate the lift-up seat 200 out of the vehicle and lower it to ground or retract the lift-up seat 200 inside the vehicle are known. FIG. 7(b) illustrates such a type of portable transmitter 100.

The portable transmitter 100 includes a casing 110, a retracting switch 112a, and a rotating-and-lowering switch 112b which are disposed on the same surface of the casing 110. The retracting switch 112a is used to retract the lift-up seat 200 into the vehicle. The rotating-and-lowering switch 112b is used to extend the lift-up seat 200 out from the vehicle. The retracting switch 112a and the rotating-and-lowering switch 112b are each implemented by a pushbutton switch which is to be turned on manually by a user. When the retracting switch 112a or the rotating-and-lowering switch 112b is held down, the portable transmitter 100 transmits a radio signal carrying a retracting or a rotating-and-lowering instruction to the vehicle. The lift-up seat 200 is then moved into or out of the vehicle according to a received one of the instructions. When the retracting switch 112a or the rotating-and-lowering switch 112b is released, the portable transmitter 100 stops transmitting the radio signal. The lift-up seat 200 then stops A certain period of time (e.g., 40 sec.) is required between the start and completion of movement of the lift-up seat 200. The user needs to hold the retracting switch 112a or the rotating-and-lowering switch 112b down for that period of time.

The operations of the portable transmitter 100 and the lift-up seat 200 will be described below in detail with reference to FIGS. 8(a) to 8(c).

When the retracting switch 112a is depressed, as indicated by a solid line in FIG. 8(a), by the user at time t101, the portable transmitter 100 simultaneously transmits, as indicated by a solid line in FIG. 8(b), a radio signal carrying the retracting instruction to the lift-up seat 200. At time t102, the lift-up seat 200 is responsive to the radio signal and, as indicated by a solid line in FIG. 8(c), starts to retract inside the vehicle. The lift-up seat 200 completes the retraction at time t105. The user visually perceives the completion of retraction of the lift-up seat 200 and then releases the retracting switch 112a at time t106. The portable transmitter 100 stops transmitting the ratio signal to the lift-up seat 200. In this way, the user keeps the retracting switch 112a held down for a period of time from time t101 to time t106.

As indicated by broken lines in FIGS. 8(a) to 8(c), when the user stops holding the retracting switch 112a down at time t103, the portable transmitter 100 almost simultaneously stops transmitting the radio signal of the retracting instruction to the lift-up seat 200. The lift-up seat 200 then stops retracting inside the vehicle. Afterwards, when the user restarts holding the retracting switch 112a down at time t104, the portable transmitter 100 restarts transmitting the radio signal of the retracting instruction to the lift-up seat 200. The lift-up seat 200 then restarts retracting into the vehicle.

As apparent from the above, the user has to continue to hold the pushbutton switch (i.e., the retracting switch 112a or the rotating-and-lowering switch 112b which will also be referred to as tact switch below) down from when the radio signal starts to be transmitted to give the lift-up seat 200 the operating instruction until the completion of the operating instruction. The keeping the tact switch held down is not quite a burden on physically unimpaired persons, but on physically impaired persons that are most of users of the lift-up seat 200.

In order to alleviate the physical burden of manipulating the tack switch on the users, the portable transmitter 100 may be designed to continue to transmit the radio signal upon holding down of the tack switch for a short time (e.g., 1 sec.). This, however, may result in the following risk. If the user drops and loses the portable transmitter 100 after the lift-up seat 200 has started to move in response to the operating instruction from the portable transmitter 100, it will result in impossibility of stopping the lift-up seat 200 urgently.

In order to alleviate the physical burden on the users, the retracting switch 112a and the rotating-and-lowering switch 112b may alternatively be implemented in place of pushbutton switches by touch switches which are to be touched by the user to operate. The tough switches, however, need be supplied with electric power to operate at all the time, thus resulting in a decrease in operating life of a battery of the portable transmitter 100.

The above problem is thought of as also being encountered in automotive power sliding door systems or power backdoor systems designed to operate for a period of time in which operating instructions, as outputted from the portable transmitter through a radio wave, are received.

SUMMARY

It is therefore an object of the invention to provide a portable device designed to decrease a physical burden on a user's operation on a push switch without sacrificing the safety and to minimize the consumption of electric energy in a power source.

According to one aspect of an embodiment, there is provided a portable device for use in controlling an operation of a controlled device which operates according to a given operating instruction for a period of time in which the controlled device continues to receive the operating instruction. The portable device comprises: (a) a push switch; (b) a power source; (c) a radio transmitter which transmits the operating instruction in the form of a radio wave to the controlled device; (d) a touch sensor which is placed in a touch-sensitive mode when supplied with electric power from the power source, when touched manually in the touch-sensitive mode, the touch sensor sensing a touch thereon; and (e) a controller which supplies the electric power from the power source to the touch sensor for a given period of time in response to the depression of the push switch. When the touch sensor senses the touch thereon, and the push switch is depressed, the controller instructs the radio transmitter to transmit the operating instruction to the controlled device and continues to make the radio transmitter transmit the operating instruction as long as the touch sensor senses the touch thereon regardless of depression of the push switch.

Specifically, when the push switch is depressed, and the touch sensor is touched by, for example, a user of the controlled device, the portable device outputs a radio signal indicative of the given instruction to the controlled device and continues to output such a radio signal for a period of time in which the touch sensor is kept touched even after the user releases the push switch. In other words, once the operating instruction has been outputted to the controlled device, the user is required only to touch the touch sensor in order to make the controlled device continue the operation. This eliminates the need for the user to continue the operation on the push switch until completion of the operation of the controlled device, thus resulting in a decrease in physical burden on the user.

In case of emergency where the controlled device should be stopped, the user is required only to stop touching the touch sensor to disable the controlled device, thereby ensuring the safety of the operation of the controlled device quickly.

The electric power continues to be supplied to the touch sensor for the given period of time in response to the depression of the push switch. Such a period of time may be set to only the length of time required by the radio transmitter to continue to transmit the operating instruction to the controlled device, thus minimizing the consumption of electric energy in the power source.

In the preferred mode of an embodiment, the touch sensor is disposed on an area of the portable device where a person holding the portable device in his or her hand is enabled to get an easy touch on the touch sensor.

The touch sensor may be disposed on a surface of the push switch.

The portable device may also include a casing having a length, a first surface, and a second surface. The second surface extends perpendicular to the first surface. The push switch is disposed in the first surface. The touch sensor is disposed on the second surface. The location of the touch sensor in a lengthwise direction of the casing is substantially the same as that of the push switch.

The casing may alternatively have the second surface opposed to the first surface. The push switch may be disposed in the first surface. The touch sensor may be disposed on the second surface. The location of the touch sensor in a lengthwise direction of the casing may be substantially the same as that of the push switch.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIGS. 4(a), 4(b), 4(c), 4(d), and 4(e) are time charts which demonstrate operations of the portable transmitter of FIG. 1;

FIGS. 8(a), 8(b), and 8(c) are time charts which demonstrate operations of the portable transmitter of FIG. 7(b).

DESCRIPTION OF THE PREFERRED EMBODIMENTS

Figure 1:
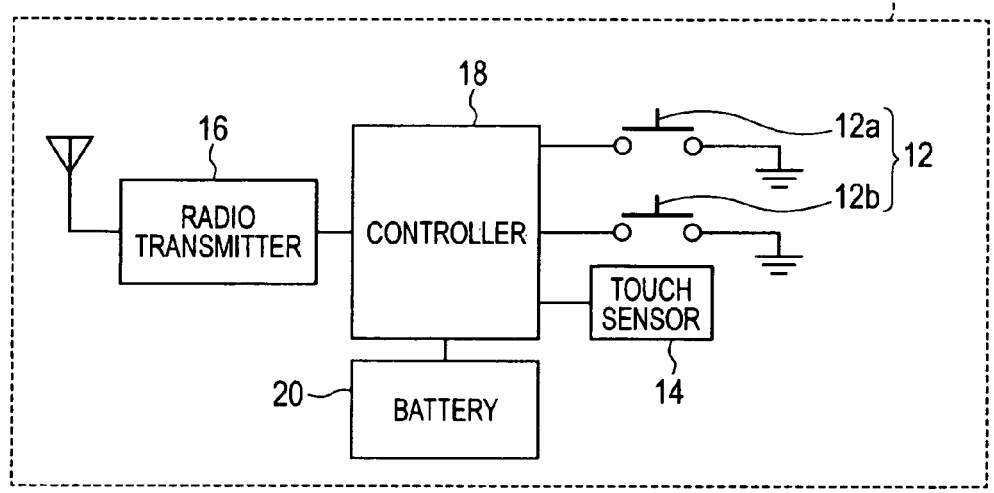
FIG. 1 is a circuit diagram which illustrates a portable transmitter according to an embodiment.

Referring to the drawings, wherein like reference numbers refer to like parts in several views, particularly to FIG. 1, there is shown a portable transmitter 1 according to the embodiment.

Figure 7A:
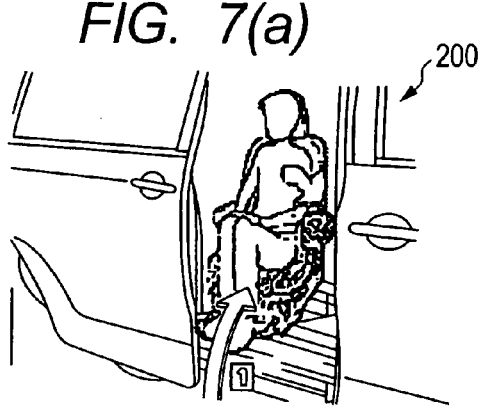
FIG. 7(a) is a partially perspective view which shows a lift-up seat that is a device to be controlled by a portable transmitter.
Figure 7B:
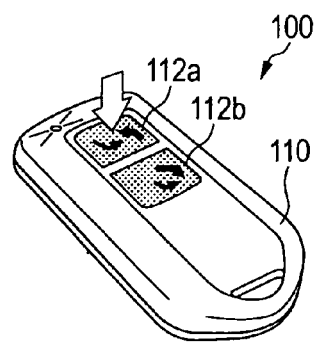
FIG. 7(b) is a perspective view which shows a conventional portable transmitter.

The portable transmitter 1 is designed as a remote wireless transmitter to output operating instructions in the form of radio waves to the lift-up seat 200, as discussed in the introductory part of this application with reference to FIG. 7(a). The portable transmitter 1 works to selectively output radio signals carrying a rotating-and-lowering instruction (which will also be referred to as an extending instruction below) to rotate the lift-up seat 200 from inside to outside an automotive vehicle and lower it to ground and a retracting instruction to retract the lift-up seat 200 into the vehicle.

Figure 2A:
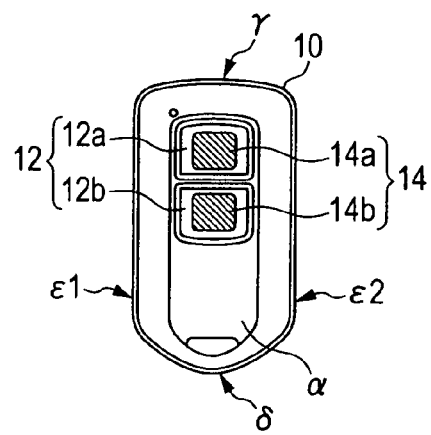
FIG. 2(a) is a front view which shows the portable transmitter of FIG. 1.
Figure 2B:
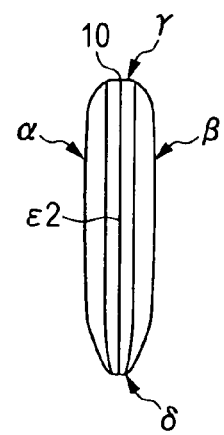
FIG. 2(b) is a side view of the portable transmitter of FIG. 1.
Figure 2C:
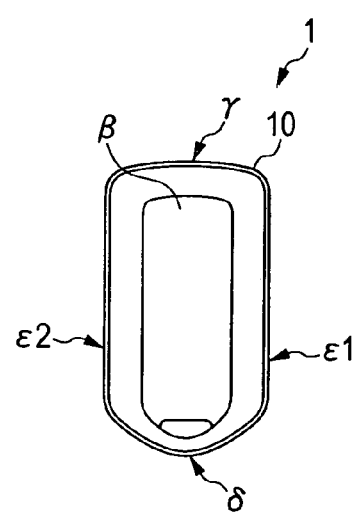
FIG. 2(c) is a back view of the portable transmitter of FIG. 1.

The portable transmitter 1 is equipped with a retracting switch 12a, a rotating-and-lowering switch 12b, touch sensors 14, a radio transmitting unit 16, a controller 18, and a battery 20 which are disposed inside a casing 10, as illustrated in FIGS. 2(a) to 2(c). The retracting switch 12a and the rotating-and-lowering switch 12b will also be generally referred to as tact switches 12 below.

The casing 10 is, as clearly illustrated in FIGS. 2(a) to 2(c), of a flat shape having six surfaces. One of these surfaces, as will be referred to as a front surface α below, has the tact switches 12 disposed therein. The surface opposed to the front surface α will be referred to as a back surface β below. The other surfaces will be referred to as side surfaces below. One of the side surfaces which is oriented upward in the drawing will also be referred to as an upper end surface γ below. One of the side surfaces which is oriented downward in the drawing will also be referred to as a lower end surface δ below. The other side surfaces facing the left and right sides of FIG. 2(a) will also be referred to as side surfaces ϵ1 and ϵ2, respectively.

The tact switches 12 are mounted in the front surface α of the casing 10. The touch sensors 14 are disposed on surfaces of the tact switches 12. Specifically, the touch sensors 14 are made up of a touch sensor 14a attached to the surface of the retracting switch 12a and a tough sensor 14b attached to the surface of the rotating-and-lowering switch 12b. The casing 10 has an inner chamber in which the touch sensors 14, the radio transmitting unit 16, and the battery 20 which supplies the electric power to the controller 18 are disposed. The battery 20 is made of, for example, a lithium coin cell. FIG. 1 illustrates the battery 20 as being installed within the casing 10.

Each of the retracting switch 12a and the rotating-and-lowering switch 12b is, as can be seen in FIG. 2(a), of a rectangular shape, as viewed from the front surface α of the casing 10. The retracting switch 12a is made of a typical push switch (also called a pushbutton switch or an on-off switch) which instructs the lift-up seat 200 to retract into the vehicle. Similarly, the rotating-and-lowering switch 12b is made of a typical push switch which instructs the lift-up seat 200 to rotate and lower to ground. This motion will also be referred to as "extension" below. The retracting switch 12a and the rotating-and-lowering switch 12b are mounted on an upper half of the front surface α of the casing 10, but may be located on a lower half or a central area thereof.

The tact switches 12 are, as can be seen in FIG. 1, disposed between ports (not shown) of the controller 18 and ground. Each of the tact switches 12 is so held by a spring (not shown) as to be, as illustrated in FIG. 2(b), flush with the front surface α of the casing 10.

When pressed manually by the user (i.e., an operator of the lift-up seat 200), a movable contact of each of the tact switches 12 is moved into the casing 10 to close fixed contacts thereof, thereby establishing an electrical connection between a corresponding one of the ports of the controller 18 and ground, so that a potential of a logic low (L) level is inputted to the controller 18.

Alternatively, when not pressed by the user, the movable contact of each of the tact switches 12 is urged and kept by the spring away from the fixed contacts, thereby breaking the electrical connection between a corresponding one of the ports of the controller 18 and ground, so that the potential of the logic low (L) level is not inputted to the controller 18.

Each of the touch sensors 14 is implemented by a typical touch-sensitive sensor which operates when touched by the user through, for example, his or her finger. Specifically, the touch sensor 14a is, as illustrated in FIG. 2(a), of a rectangular shape and slightly smaller in size than the retracting switch 12a. Similarly, the touch sensor 14b is of a rectangular shape and slightly smaller in size than the rotating-and-lowering switch 12b. The touch sensors 14 are disposed on the surfaces of the tact switches 12 that are an area of the portable transmitter 1 which provides an easy touch on the touch sensors 14 to the user holding the portable transmitter 1 in his or her hand.

The touch sensors 14 are electrically connected to the controller 18 and also connected to the battery 20 through the controller 18. Each of the touch sensors 14 is kept in a touch sensitive mode (i.e., an active state) while being supplied with electric power from the battery 20 through the controller 18. When kept in the touch sensitive mode and touched by the user, the touch sensor 14 outputs a signal indicative thereof to the controller 18. When not supplied with the electric power from the battery 20, the touch sensors 14 are placed in a touch insensitive mode (i.e., an inactive state).

The radio transmitting unit 16 is equipped with a transmit antenna which outputs a low-frequency UHF radio wave and is electrically connected to the battery 20. The radio transmitting unit 16 is operable to output a radio signal of the retracting or rotating-and-lowering instruction to the lift-up seat 200 while being supplied with the electric power from the battery 20 through the controller 18, while it is inoperable while not being supplied with the power from the battery 20. The radio transmitting unit 16 may alternatively be designed to transmit a high-frequency RF radio wave or another type of radio wave.

The controller 18 is implemented by a known microcomputer equipped with a CPU and memories. The CPU executes programs stored in the memory to perform several given functions which will be described below.

The controller 18 is, as described above, electrically connected to the battery 20 and operates on supply of electric power from the battery 20. Specifically, when either of the retracting switch 12a or the rotating-and-lowering switch 12b is turned on to input the logic low level signal to a corresponding one of the ports of the controller 18, the controller 18 is switched from a sleep mode to an active mode.

When placed in the active mode, the controller 18 starts to count using a built-in timer the time elapsed from a reference time that is the moment when the controller 18 is switched to the active mode and also supplies the electric power from the battery 20 to a corresponding one of the touch sensors 14 for a preselected touch-sensitive period of time to place the touch sensor 14 in the touch sensitive mode. When touched by the user, the touch sensor 14 outputs a signal indicative thereof to the controller 18. When switched from the sleep mode to the active mode, the controller 18 also supplies the electric power from the battery 20 to the radio transmitting unit 16 for the same period of time as the above touch-sensitive period of time to place the radio transmitting unit 16 in the active mode in which the UHF radio signal is transmittable to the lift-up seat 200. The touch-sensitive period of time is set to, for example, 50 sec. to 60 sec. that is the length of time enough for the lift-up seat 200 to start and complete the retracting or rotating-and-lowering operation.

The controller 18 is sensitive to the user's touch on each of the touch sensors 14 and depression of a corresponding one of the tact switches 12 to output the UHF radio signal indicative of a corresponding one of the retracting instruction and the rotating-and-lowering instruction through the radio transmitting unit 16. The controller 18 then makes the ratio transmitting unit 16 continue to output such a UHF signal as long as the touch sensor 14 is sensing the user's touch even after the tact switch 12 is released.

Specifically, when the retracting switch 12a is depressed while the signal indicating the user's touch on the touch sensor 14 is being inputted to the controller 18, the controller 18 instructs the ratio transmitting unit 16 to start to output the UHF signal of the retracting instruction to the lift-up seat 200 and then makes the ratio transmitting unit 16 continue to output such a UHF signal while the signal is being outputted from the touch sensor 14 even when the retracting switch 12a has been released.

When the rotating-and-lowering switch 12b is depressed while the signal indicating the user's touch on the touch sensor 14 is being inputted to the controller 18, the controller 18 instructs the ratio transmitting unit 16 to start to output the UHF signal of the rotating-and-lowering instruction to the lift-up seat 200 and then makes the ratio transmitting unit 16 continue to output such a UHF signal while the signal is being outputted from the touch sensor 14 even when the rotating-and-lowering switch 12b has been released.

When entering the active mode from the sleep mode, the controller 18, as described above, starts to count the time elapsed from the moment when the active mode is entered through the timer. After a given operation period of time which is longer than the touch-sensitive period of time has elapsed, the controller 18 is placed in the sleep mode again. The operation period of time is set to, for example, 300 sec. which is longer than the touch-sensitive period of time for which the touch sensors 14 is kept in the touch sensitive mode.

The transmission of each of the retracting instruction and the rotating-and-lowering instruction from the portable transmitter 1 to the lift-up seat 200 will be described below with reference to FIG. 3.

Figure 3:
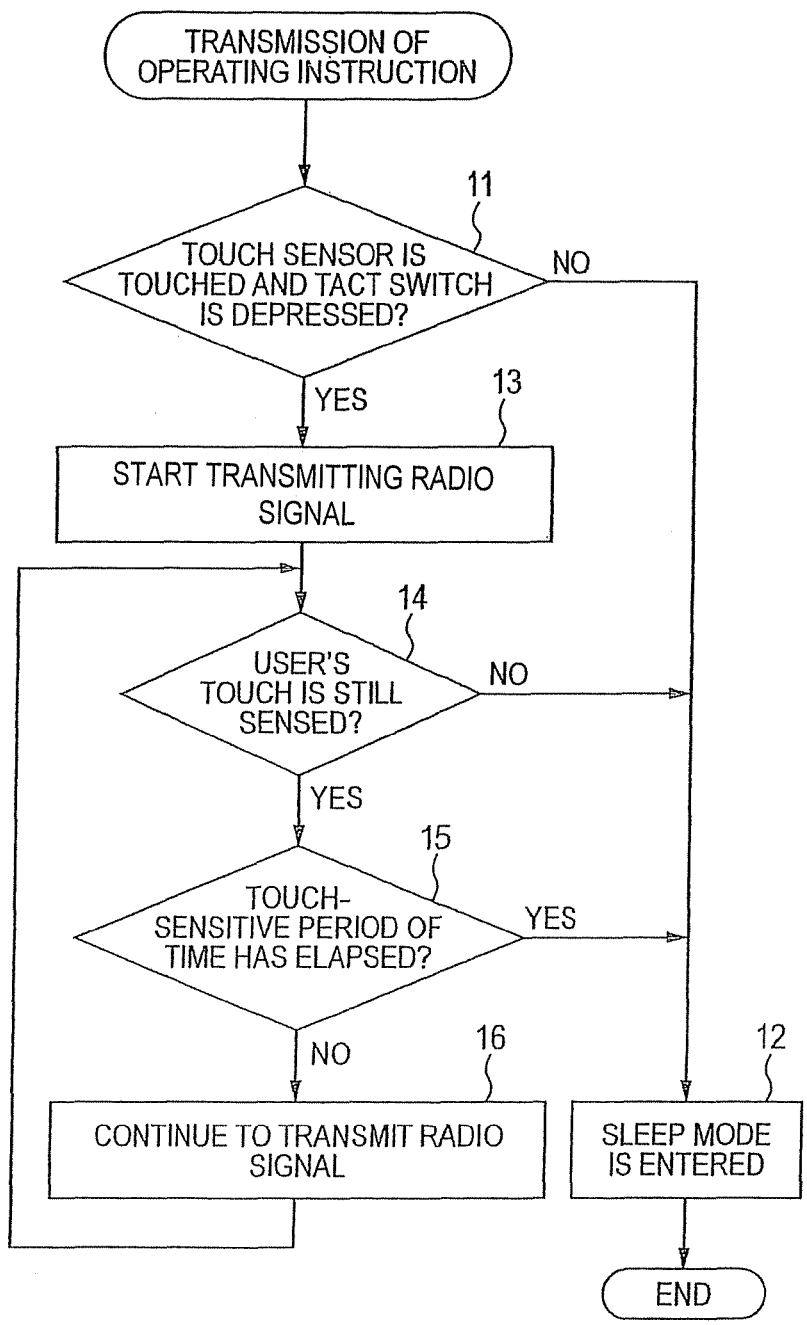
FIG. 3 is a flowchart of an instruction transmission control program to be executed by a controller of the portable transmitter of FIG. 1.

FIG. 3 is a flowchart an instruction transmission control program to be executed by the controller 18 of the portable transmitter 1. This program is initiated immediately after the controller 18 enters the active mode upon the depression of either of the tact switches 12.

After entering the program, the routine proceeds to step 11 wherein it is determined whether the touch sensor 14 is sensing the user's touch thereon, and a corresponding one of the tact switches 12 (i.e., the retracting switch 12a or the rotating-and-lowering switch 12b) is depressed or not.

If a NO answer is obtained in step 11, that is, the touch sensor 14 is not sensing the user's touch or the tact switch 12 is not depressed, it means that the user has depressed the tact switch 12 through the touch sensor 14, but released his or her finger therefrom immediately or has stopped depressing only the tact switch 12 immediately. The portable transmitter 1, therefore, does not output the UHF radio signal indicative of one of the retracting instruction and the rotating-and-lowering instruction which corresponds to the one of the tact switches 12 having been depressed. The routine then proceeds to step 12 wherein the sleep mode is entered after elapse of the above operation period of time and terminates.

Alternatively, if a YES answer is obtained in step 11, that is, the touch sensor 14 is sensing the user's touch, and the tact switch 12 is depressed, it means the user intends to send the operating instruction to the lift-up seat 200 through the portable transmitter 1. The routine then proceeds to step 13 wherein the portable transmitter 1 starts to output the radio signal of the operating instruction to the lift-up seat 200.

The routine proceeds to step 14 wherein it is determined whether the touch sensor 14 is still kept touched or not. If a NO answer is obtained meaning that the touch sensor 14 is no longer touched, then the routine proceeds to step 12 to place the controller 18 in the sleep mode and stop transmitting the radio signal to the lift-up seat 200. Alternatively, if a YES answer is obtained meaning that the touch sensor 14 is still kept touched, then the routine proceeds to step 15 wherein it is determined whether the touch-sensitive period of time has elapsed since the portable transmitter 1 entered the active mode or not. If a YES answer is obtained meaning that the touch-sensitive period of time expires, then the routine proceeds to step 12 and terminates. Alternatively, if a NO answer is obtained meaning that the touch-sensitive period of time does not yet expire, the routine proceeds to step 15 wherein the controller 18 makes the ratio transmitting unit 16 to continue to transmit the radio signal to the lift-up seat 200.

After step 16, the routine returns back to step 14 to determine whether the touch sensor 14 is still kept touched or not.

The operations of the portable transmitter 1 and the lift-up seat 200 will be described with reference to FIGS. 4(a) to 4(e). Solid lines demonstrate an example where the user pushes the tact switch 12 at time t11 and stops pushing it at time t13 when the user has perceived that the lift-up seat 200 has started to move according to the operating instruction, as requested by the pushed tact switch 12, but still continues to touch the touch sensor 14, and where the user has found at time t14 that the operation of the lift-up seat 200 has been completed and stops touching the tack sensor 14.

When the tact switch 12 is, as illustrated in FIG. 4(a), turned on by the user at time t11, the controller 18 of the portable transmitter 1 is switched from the sleep mode to the active mode. The controller 18 simultaneously supplies, as indicated by the solid line in FIG. 4(b), the electric power from the battery 20 to the touch sensor 14. Upon the supply of electric power, the touch sensor 14 is, as indicated by the solid line in FIG. 4(c), placed in the touch sensitive mode and outputs a signal indicating the user's touch thereon to the controller 18. The controller 18 then determines that the user's touch is sensed by the touch sensor 14, and the tact switch 12 is depressed and makes, as indicated by the solid line in FIG. 4(d), the radio transmitting unit 16 start to output the UHF ratio signal indicating the operating instruction, as requested by the depressed tact switch 12. At time t13, the lift-up seat 200, as indicated by the solid line in FIG. 4(e), starts to move according to the instruction received through the UHF ratio signal and completes it at time t14. When the user perceives the completion of operation of the lift-up seat 200 and releases his or her finger from the touch sensor 14 at time t14, the touch sensor 14, as indicated by the solid line in FIG. 4(c), stops outputting the signal indicative of the user's touch to the controller 18. The controller 18, as indicate by the solid line in FIG. 4(d), stops the radio transmitting unit 16 from transmitting the UHF signal to the lift-up seat 200 and also stops, as indicate by the solid line in FIG. 4(b), supplying the electric power from the battery 20 to the touch sensor 14. The controller 18 then enters the sleep mode.

Broken lines in FIGS. 4(a) to 4(e) demonstrate an example where the user releases his or her finger from the touch sensor 14 at time t15 even when the operation of the lift-up seat 200 is not yet completed. When the user stops touching the touch sensor 14 at time t15, the touch sensor 14, as indicate by the broken line in FIG. 4(c), stops outputting the signal indicative of the user's touch to the controller 18. The controller 18, as indicate by the broken line in FIG. 4(d), stops the radio transmitting unit 16 from transmitting the UHF signal to the lift-up seat 200 and also stops, as indicate by the broken line in FIG. 4(b), supplying the electric power from the battery 20 to the touch sensor 14. The controller 18 then enters the sleep mode.

Although not illustrated in FIGS. 4(a) to 4(e), when the user continues to touch the touch sensor 14 after time t14 when the operation of the lift-up seat 200 is completed, the controller 18 enters the sleep mode after the elapse of the touch-sensitive period of time since the time t11.

When the user continues to touch the touch sensor 14, but releases the tact switch 12 or stops touching the touch sensor 14 between time t11 and time t12, the controller 18 enters the sleep mode after the elapse of the above described operation period of time since the time t11.

As apparent from the above discussion, the portable transmitter 1 starts to output the radio signal indicative of the selected operating instruction to the lift-up seat 200 at the time when the user's touch on the touch sensor 14 is sensed, and the tact switch 12 is turned on and continues to output it as long as the user's touch is being sensed regardless of whether the tact switch 12 has been released or not. In other words, the user is required only to continue to touch the touch sensor 14 after the portable transmitter 1 has started to output the operating instruction to the lift-up seat 200 in order to complete the operation of the lift-up seat 200, thus resulting in a decrease in physical burden on the user.

If an emergency arises, the user may stop touching the tact switch 12 to stop the operation of the lift-up seat 200 immediately. This ensures the safety of the user.

The portable transmitter 1 is responsive to the turning on of the tact switch 12 to supply the electric power from the battery 20 to a corresponding one of the touch sensors 14 only for the touch-sensitive period of time. The touch-sensitive period of time is set to the length of time required for the lift-up seat 200 to start and complete the retracting or rotating-and-lowering operation, thus minimizing the consumption of electric power of the battery 20.

The touch sensors 14 are, as described above, disposed on the surfaces of the tact switches 12 that are in an area of the portable transmitter 1 where the user can keep his or her finger placed on the touch sensors 14 easily while holding the portable transmitter 1 in his or her hand, thus alleviating the physical burden on the user.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

The touch-sensitive period of time for which each of the touch sensors 14 is placed in the active mode to be sensitive to a touch of the user thereon is, as described above, selected to be the time required by the lift-up seat 200 to start and complete the retracting or rotating-and-lowering operation plus a given marginal time, but may be set to another period of time. For example, the lift-up seat 200 is designed to transmit a radio signal indicating the completion of operation thereof. The portable transmitter 1 is also designed to receive the signal from the lift-up seat 200 to know the completion of operation of the lift-up seat 200. The controller 18 may variably set the touch-sensitive period of time to a time interval from when the controller 18 is placed in the active mode until the controller 18 receives the signal indicating the completion of operation of the lift-up seat 200. In other words, the controller 18 may continue to supply the electric power to the touch sensor 14 until the completion of operation of the lift-up seat 200.

Figure 5A:
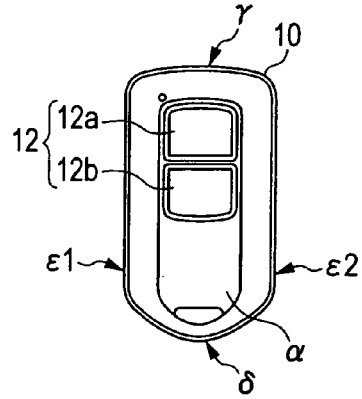
FIG. 5(a) is a front view which shows a modification of the portable transmitter of FIG. 1.
Figure 5B:
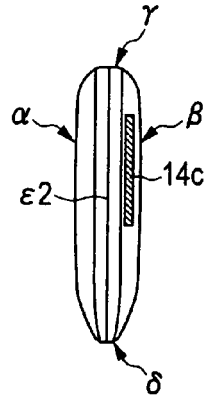
FIG. 5(b) is a side view of the portable transmitter of FIG. 5(a)
Figure 5C:
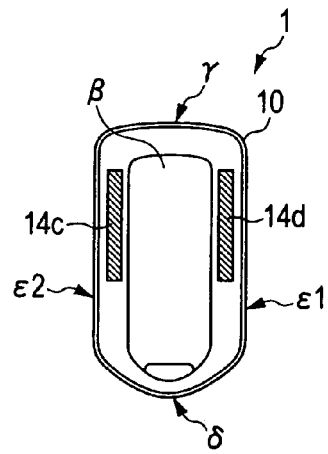
FIG. 5(c) is a back view of the portable transmitter of FIG. 5(a)

The touch sensors 14 are mounted on the surfaces of the tact switches 12 on the front surface α of the casing 10 of the portable transmitter 1, but may alternatively be, as denoted by 14c and 14d in FIGS. 5(a) to 5(c), affixed to the side surfaces ϵ2 and ϵ1, respectively, which are perpendicular to the front surface α. The casing 10 may be designed to have a given length. The locations of the touch sensors 14c and 14d in the lengthwise direction of the casing 10 may be substantially the same as those of the tact switches 12 on the front surface α. Only either one of the touch sensors 14c and 14d may be attached to the portable transmitter 1.

Figure 6A:
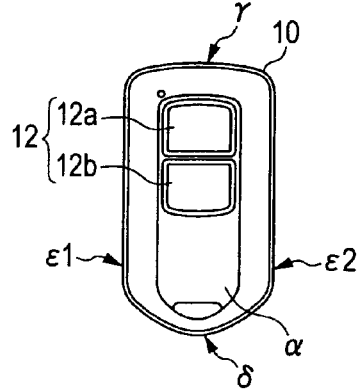
FIG. 6(a) is a front view which shows a second modification of the portable transmitter of FIG. 1.
Figure 6B:
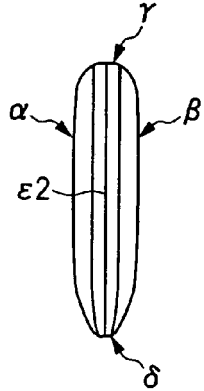
FIG. 6(b) is a side view of the portable transmitter of FIG. 6(a)
Figure 6C:
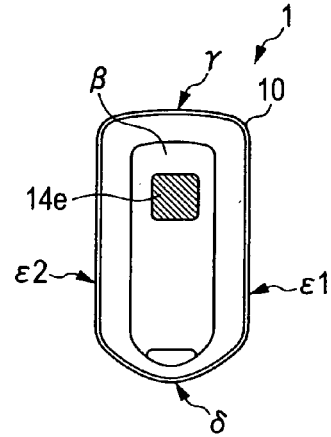
FIG. 6(c) is a back view of the portable transmitter of FIG. 6(a)

The portable transmitter 1 may be, as illustrated in FIGS. 6(a) to 6(c), designed to have only a touch sensor 14e which is operable with both the tact switches 12a and 12b. The touch sensor 14e is affixed to the back surface β of the casing 10 of the portable transmitter 1. The location of the touch sensor 14e in the lengthwise direction of the casing 10 may be substantially the same as those of the tact switches 12 on the front surface α.

As illustrated in FIGS. 2(a) to 6(c), the touch sensors 14 are preferably located on an area of the portable transmitter 1 where the user holding the portable transmitter 1 in his or her hand makes his or her finger touch the touch sensors 14 naturally.

The touch sensors 14 may alternatively be disposed on at least one of the upper end surface γ and the lower end surface δ extending perpendicular to the front surface α of the casing 10. In other words, the touch sensors 14 may be located on an area of the portable transmitter 1 where the user holding the portable transmitter 1 in his or her hand extends his or her finger to the touch sensors 14 easily.

The portable transmitter 1 may be designed to be used with automotive power sliding door systems or power backdoor systems which are operable for a period of time in which operating instructions, as outputted from the portable transmitter 1 through a radio wave, are received.

What is claimed is:

1. A portable device mounted on a vehicle which transmits an operating instruction in the form of a radio wave to a vehicle-side device which operates according to the operating instruction for a period of time in which the vehicle-side device continues to receive the operating instruction, the portable device comprising:
    a push operating switch corresponding to the operating instruction;
    a radio wave transmitting portion which transmits the operating instruction in the form of the radio wave;
    a control portion which makes the radio wave transmitting portion transmit the operating instruction in the form of the radio wave in response to the depression of the push operating switch;
    a battery supplying electric power; and
    a touch sensor which operates upon supply of the electric power from the battery to sense a user's touch; wherein
    the control portion supplies the electric power from the battery to the touch sensor for a predetermined period of time based on operation of the push operating switch;
    the radio wave transmitting portion starts to transmit the operating instruction in the form of the radio wave in correspondence with the push operating switch based on the fact that the touch sensor is sensing the user's touch and the push operating switch is being depressed; and
    the operating instruction continues to be transmitted in the form of the radio wave in correspondence with the push operating switch as long as the user's touch is being sensed by the touch sensor after start of the transmission even if the push operating switch is not operated.

2. The portable device as set forth in claim 1, wherein the touch sensor is disposed on a given portion where a user can easily touch the touch sensor when the user operates the push operating switch while the user is holding the portable device in his or her hand.

3. A portable device as set forth in claim 2, wherein the touch sensor is disposed on a surface of the push operating switch.

4. A portable device as set forth in claim 2, wherein the touch sensor is disposed on a surface of a casing of the portable device which intersects with a surface on which the push operating switch is disposed, and wherein a position of the touch sensor in a longitudinal direction is substantially identical with a position of the push operating switch in the longitudinal direction.

5. A portable device as set forth in claim 2, wherein the touch sensor is disposed on a surface of a casing of the portable device which is opposed to a surface on which the push operating switch is disposed, and wherein a position of the touch sensor in a longitudinal direction is substantially identical with a position of the push operating switch in the longitudinal direction.

* * * * *